United States Patent
Lee et al.

(10) Patent No.: US 9,578,533 B2
(45) Date of Patent: Feb. 21, 2017

(54) METHOD AND APPARATUS FOR ESTIMATING SPEED OF USER EQUIPMENT IN WIRELESS COMMUNICATION SYSTEM

(71) Applicant: LG ELECTRONICS INC., Seoul (KR)

(72) Inventors: Youngdae Lee, Anyang-si (KR); Sungjun Park, Anyang-si (KR); Seungjune Yi, Anyang-si (KR); Sunghoon Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/394,694

(22) PCT Filed: Apr. 16, 2013

(86) PCT No.: PCT/KR2013/003170
§ 371 (c)(1),
(2) Date: Oct. 15, 2014

(87) PCT Pub. No.: WO2013/157805
PCT Pub. Date: Oct. 24, 2013

(65) Prior Publication Data
US 2015/0078184 A1 Mar. 19, 2015

Related U.S. Application Data

(60) Provisional application No. 61/625,634, filed on Apr. 17, 2012.

(51) Int. Cl.
*H04W 24/10* (2009.01)
*H04W 64/00* (2009.01)
*H04W 36/32* (2009.01)

(52) U.S. Cl.
CPC ........... *H04W 24/10* (2013.01); *H04W 64/006* (2013.01); *H04W 36/32* (2013.01)

(58) Field of Classification Search
CPC ............................ H04W 24/10; H04W 64/006
See application file for complete search history.

(56) References Cited

U.S. PATENT DOCUMENTS

| | | | |
|---|---|---|---|
| 7,058,406 B1 | 6/2006 | Lundell et al. | |
| 8,738,008 B2 * | 5/2014 | Wu | H04W 36/0083 439/436 |
| 2009/0238117 A1* | 9/2009 | Somasundaram | H04J 11/0093 370/328 |
| 2010/0113019 A1* | 5/2010 | Jeong | H04W 36/0005 455/435.2 |
| 2010/0240356 A1 | 9/2010 | Lee et al. | |
| 2012/0120802 A1* | 5/2012 | Mach | H04W 28/02 370/235 |
| 2012/0155364 A1* | 6/2012 | Kim | H04W 4/06 370/312 |

* cited by examiner

*Primary Examiner* — Anh Ngoc Nguyen
(74) *Attorney, Agent, or Firm* — Dentons US LLP

(57) ABSTRACT

A method and apparatus for estimating a speed of a user equipment (UE) in a wireless communication system is provided. The method includes counting a number of cell reselections based on whether a cell is reselected due to a user service or not, and estimating a speed of the UE based on the number of the cell reselections.

14 Claims, 7 Drawing Sheets

METHOD AND APPARATUS FOR ESTIMATING SPEED OF USER EQUIPMENT IN WIRELESS COMMUNICATION SYSTEM

This application is a 35 USC §371 National Stage entry of International Application No. PCT/KR2013/003170, filed Apr. 16, 2013, and claims priority to U.S. Provisional Application No. 61/625,634 filed Apr. 17, 2012, each of which are hereby incorporated by reference in its entirety.

BACKGROUND OF THE INVENTION

Field of the Invention

The present invention relates to wireless communications, and more particularly, to a method and apparatus for estimating a speed of a user equipment (UE) in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

A cell reselection procedure may be performed in the 3GPP LTE. The cell reselection procedure allows a user equipment (UE) to select a more suitable cell and camp on it. When the UE is in either "Camped Normally" state or "Camped on Any Cell" state on a cell, the UE shall attempt to detect, synchronize, and monitor intra-frequency, inter-frequency and inter-radio access technology (RAT) cells indicated by a serving cell. That is, when camped on a cell, the UE shall regularly search for a better cell according to a cell reselection criteria. If a better cell is found, that cell is selected. The change of cell may imply a change of RAT. The number of cell reselections may be used for determining a mobility state of the UE. For example, if a large number of cell reselections is detected, it may be determined that the UE moves fast.

The 3GPP LTE can provide a multimedia broadcast/multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

It is required that a method of estimating a speed of a UE when the UE perform a cell reselection procedure due to a user service.

SUMMARY OF THE INVENTION

The present invention provides a method and apparatus for estimating a speed of a user equipment (UE) in a wireless communication system. The present invention provides a method for estimating a speed of a user equipment when the UE perform a cell reselection procedure due to a user service.

In an aspect, a method for estimating, by a user equipment (UE), a speed of the UE in a wireless communication system is provided. The method includes counting a number of cell reselections based on whether a cell is reselected due to a user service or not, and estimating a speed of the UE based on the number of the cell reselections.

If the cell is reselected due to the user service, the cell may be not counted for the number of cell reselections.

If the cell is reselected due to reasons other than the user service, the cell may be counted for the number of cell reselections.

The number of cell reselections may be counted for a specific time period.

The user service may be a multimedia broadcast/multicast service (MBMS) service.

In another aspect, a user equipment (UE) in a wireless communication system is provided. The UE includes a radio frequency (RF) unit for transmitting or receiving a radio signal, and a processor coupled to the RF unit, and configured for counting a number of cell reselections based on whether a cell is reselected due to a user service or not, and estimating a speed of the UE based on the number of the cell reselections.

A speed of a UE is correctly estimated when the UE performs a cell reselection procedure due to a user service.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
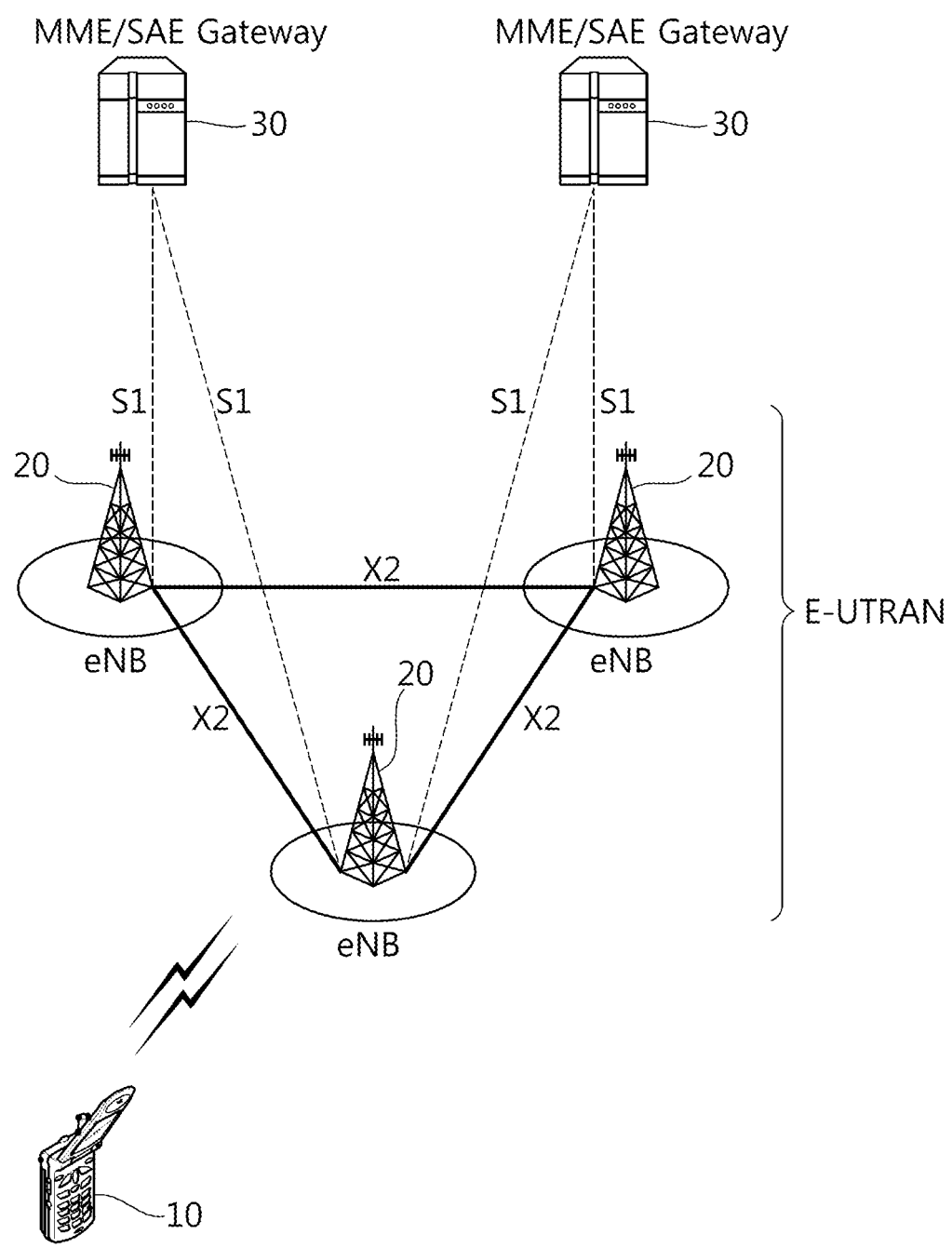
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
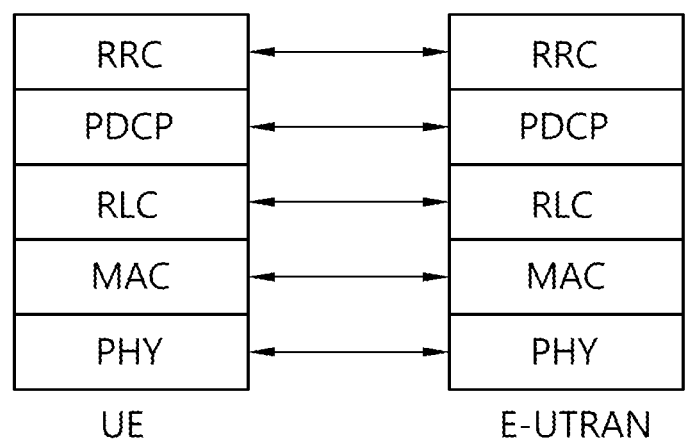
FIG. 2 is a diagram showing a radio interface protocol architecture for a control plane.
Figure 3:
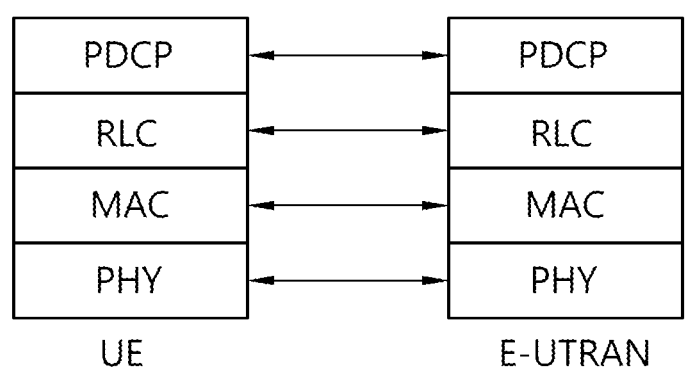
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
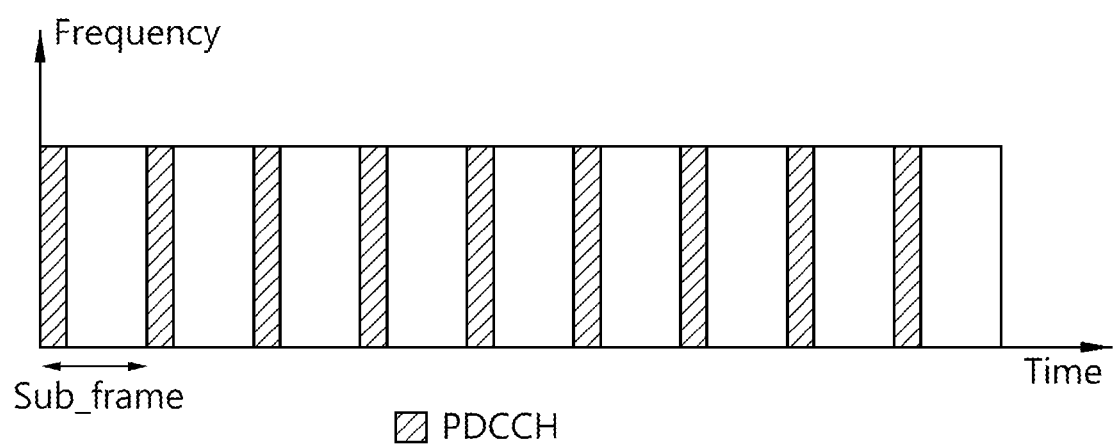
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether the RRC of the UE is logically connected to the RRC of the E-UTRAN. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED state has the RRC connection established with the E-UTRAN, the E-UTRAN can recognize the existence of the UE in the RRC_CONNECTED and can effectively control the UE. Meanwhile, the UE in the RRC_IDLE state cannot be recognized by the E-UTRAN, and a core network (CN) manages the UE in unit of a tracking area (TA) which is a larger area than a cell. That is, only the existence of the UE in the RRC_IDLE state is recognized in unit of a large area, and the UE must transition to the RRC_CONNECTED state to receive a typical mobile communication service such as voice or data communication.

When the user initially powers on the UE, the UE first searches for a proper cell and then remains in the RRC_IDLE state in the cell. When there is a need to establish an RRC connection, the UE which remains in the RRC_IDLE state may establish the RRC connection with the RRC of the E-UTRAN through an RRC connection procedure and then may transition to the RRC_CONNECTED state. The UE which remains in the RRC_IDLE state may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED state. To access the network, the UE may perform a process of registering to the network through an initial attach procedure. If the initial attach procedure is successfully performed, the UE and the MME may be in the EMM-REGISTERED state.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE state establishes an RRC connection with the E-UTRAN, the UE may be in the ECM-CONNECTED state. When the MME in the ECM-IDLE state establishes an S1 connection with the E-UTRAN, the MME may be in the ECM-CONNECTED state. When the UE is in the ECM-IDLE state, the E-UTRAN does not have information on the context of the UE. Therefore, the UE in the ECM-IDLE state can perform a UE-based mobility related procedure such as cell selection or cell reselection without having to receive a command of the network. If a location of the UE in the ECM-IDLE state becomes different from a location known to the network, the UE may report the location of the UE to the network through a tracking area update procedure. On the other hand, the mobility of the UE in the ECM-CONNECTED state may be managed by the command of the network.

Figure 5:
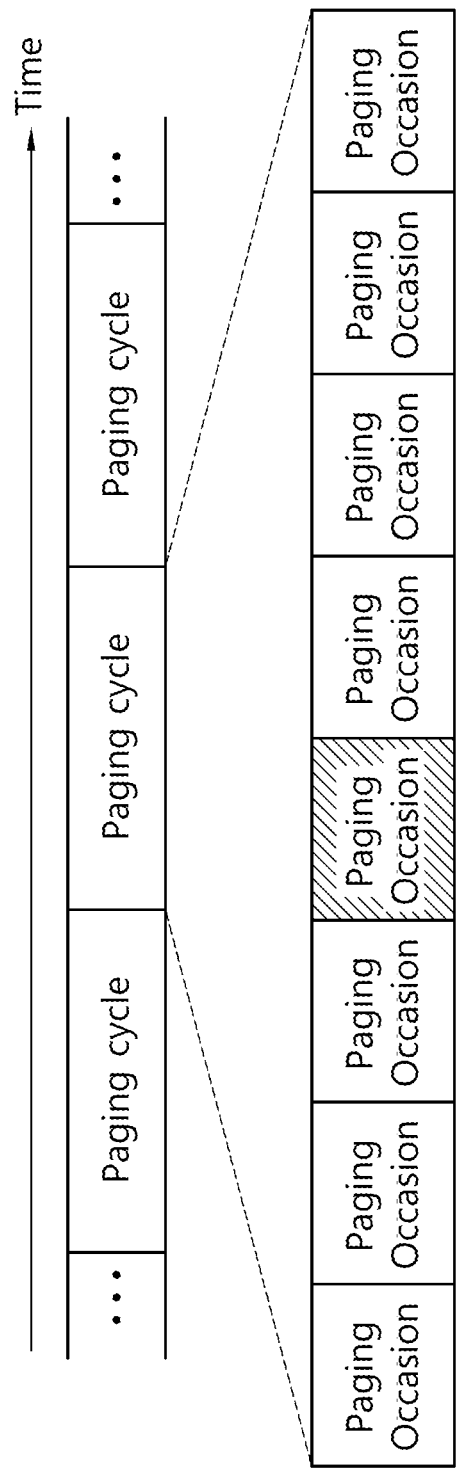
FIG. 5 shows transmission of a paging channel.

FIG. 5 shows transmission of a paging channel.

When there is data to be transmitted by a network to a specific UE or a call delivered to the specific UE, the paging message is used to search and wake up the UE. To transmit the paging message, an E-UTRAN may search for a certain location area in which the UE is currently located, and may transmit the paging message through one cell belonging to the location area in which the UE is located. For this, whenever there is a change in the location area, the UE may report the change to the network, which is called a location area update procedure.

Referring to FIG. 5, a plurality of paging cycles is configured, and one paging cycle may include a plurality of paging occasions. When receiving the paging message, the UE may perform discontinuous reception (DRX) to decrease power consumption. For this, the network may configure a plurality of paging occasions for every time period called a paging cycle, and a specific UE may receive the paging message by monitoring a paging channel only during a specific paging occasion. The UE does not monitor the paging channel in a time other than the specific paging occasion assigned to the UE. One paging occasion may correspond to one TTI.

The system information is necessary information which must be known to the UE to access the network. The UE must entirely receive the system information before the network access, and must always have the latest system information. In addition, since the system information is information which must be known to all UEs in one cell, the BS may periodically transmit the system information.

The system information may include a master information block (MIB), a scheduling block (SB), a system information block (SIB), etc. The MIB may indicate a physical configuration (e.g., a bandwidth, etc.) of a corresponding cell. The SB may indicate transmission information of SIBs, for example, a transmission period of the SIBs. The SIB is a set of related system information. For example, a certain SIB may include only information of a neighbor cell, and another SIB may include only information of an uplink radio channel used by the UE.

The BS may transmit the paging message to the UE to report whether there is a change in the system information. In this case, the paging message may include a system information change indicator. If the paging message received according to the paging cycle includes the system information change indicator, the UE may receive the system information transmitted through a BCCH which is a logical channel.

Referring to the section 5.2.1.2 of 3GPP TS 37.320 V10.4.0 (2011-12), if the UE which is RRC-connected with a serving cell detects a radio link failure (RLF) or a handover failure (HOF) during an RRC connection reestablishment procedure and thus transitions to the RRC_IDLE state, the UE may store information related to the failure, that is, RLF information. The RLF information may include a channel measurement value of a last serving cell and a channel measurement value of a neighbor cell, information of a cell in which the RLF occurs, information of a location at which the RLF occurs, whether a failure is the RLF or the handover failure, an identifier (ID) of a cell which attempts RRC connection reestablishment, an ID of a cell to which the UE is lastly successfully connected before the RLF, etc. The channel measurement value of the cell may be reference signal received power (RSRP), reference signal received quality (RSRQ), etc. In addition, if specific location information such as global navigation satellite system (GNSS) location information or the like is available, the information of the location at which the RLF occurs may include a latitude, a longitude (mandatory), an altitude (conditional on availability), a velocity (conditional on availability), a direction (conditional on availability), etc.

If the UE stores the RLF information, the UE may report availability of the RLF information to the BS through an RRC connection reestablishment message during the RRC connection reestablishment procedure. Alternatively, the UE may report the availability of the RLF information to the BS through an RRC connection reconfiguration message during an RRC connection reconfiguration procedure. In addition, if the RRC connection reconfiguration procedure fails, the UE enters the RRC_IDLE state, and thereafter the UE may transition again to the RRC_CONNECTED state by performing the RRC connection establishment procedure according to an instruction of an NAS layer. In this case, the UE may report the availability of the RLF information to the BS through an RRC connection establishment complete message during the RRC connection establishment procedure.

The availability of the RLF information may be an rlf-InfoAvailable indicator defined in 3GPP TS 36.331 V10.0.0 (2010-12). If the RLF occurs in 3GPP LTE, rlf-InfoAvailable indicator may be configured only in one LTE connection establishment message transmitted after the RLF.

When the UE reports the availability of the RLF information to the BS, the BS may request the RLF information by transmitting a UE information request message to the UE. Upon receiving the UE information request message, the UE may report the RLF information (i.e., rlf-Report) by using a UE information response message.

A cell reselection evaluation process is described below. It may refer to 3GPP TS 36.304 V10.5.0 (2012-03).

A reselection priorities handling is described first. Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signaling, the UE shall ignore all the priorities provided in system information. If UE is in "camped on any cell" state, the UE shall only apply the priorities provided by the system information from current cell, and the UE preserves priorities provided by dedicated signaling unless specified otherwise. When the UE in "camped normally" state, has only dedicated priorities other than for the current frequency, the UE shall consider the current frequency to be the lowest priority frequency (i.e. lower than the eight network configured values). While the UE is camped on a suitable closed subscriber group (CSG) cell, the UE shall always consider the current frequency to be the highest priority frequency (i.e. higher than the eight network configured values), irrespective of any other priority value allocated to this frequency. If the UE has knowledge on which frequency a multimedia broadcast multicast service (MBMS) service of interest is provided, it may consider that frequency to be the highest priority during the MBMS session. The UE shall delete priorities provided by dedicated signaling when:
  the UE enters RRC_CONNECTED state; or
  the optional validity time of dedicated priorities (T320) expires; or
  a PLMN selection is performed on request by NAS.

The UE shall only perform cell reselection evaluation for E-UTRAN frequencies and inter-RAT frequencies that are given in the system information and for which the UE has a priority provided. The UE shall not consider any black listed cells as candidate for cell reselection. The UE shall inherit the priorities provided by dedicated signaling and the remaining validity time (i.e., T320 in E-UTRA, T322 in UTRA and T3230 in GERAN), if configured, at inter-RAT cell (re)selection.

Measurement rules for cell reselection are described. When evaluating Srxlev and Squal of non-serving cells for reselection purposes, the UE shall use parameters provided by the serving cell. Srxlev is a cell selection RX level value (dB), and Squal is a cell selection quality value (dB).

Following rules are used by the UE to limit needed measurements:
  If the serving cell fulfils Srxlev>SIntraSearchP and Squal>SIntraSearchQ, the UE may choose not to perform intra-frequency measurements. SIntraSearchP and SIntraSearchQ are described in Table 1 below.
  Otherwise, the UE shall perform intra-frequency measurements.
  The UE shall apply the following rules for E-UTRAN inter-frequencies and inter-RAT frequencies which are indicated in the system information and for which the UE has priority provided:
  For an E-UTRAN inter-frequency or inter-RAT frequency with a reselection priority higher than the reselection priority of the current E-UTRA frequency, the UE shall perform measurements of higher priority E-UTRAN inter-frequency or inter-RAT frequencies.
  For an E-UTRAN inter-frequency with an equal or lower reselection priority than the reselection priority of the current E-UTRA frequency and for inter-RAT frequency with lower reselection priority than the reselection priority of the current E-UTRAN frequency:

If the serving cell fulfils Srxlev>SnonIntraSearchP and Squal>SnonIntraSearchQ, the UE may choose not to perform measurements of E-UTRAN inter-frequencies or inter-RAT frequency cells of equal or lower priority. SnonintraSearchP and SnonIntraSearchQ are described in Table 1 below.

Otherwise, the UE shall perform measurements of E-UTRAN inter-frequencies or inter-RAT frequency cells of equal or lower priority.

Cell reselection parameters are broadcast in the system information and are read from the serving cell. Table 1 shows cell reselection parameters.

TABLE 1

| Parameter | Description |
| --- | --- |
| cellReselectionPriority | This specifies the absolute priority for E-UTRAN frequeny or UTRAN frequency or group of GERAN frequencies or band class of CDMA2000 HRPD or band class of CDMA2000 1xRTT. |
| Q offset$_{s,n}$ | This specifies the offset between the two cells. |
| Qoffset$_{frequency}$ | Frequency specific offset for equal priority E-UTRAN frequencies. |
| Q$_{hyst}$ | This specifies the hysteresis value for ranking criteria. |
| Q$_{qualmin}$ | This specifies the minimum required quality level in the cell in dB. |
| Q$_{rxlevmin}$ | This specifies the minimum required Rx level in the cell in dBm. |
| Treselection$_{RAT}$ | This specifies the cell reselection timer value. For each target E-UTRA frequency and for each RAT (other than E-UTRA) a specific value for the cell reselection timer is defined, which is applicable when evaluating reselection within E-UTRAN or towards other RAT (i.e. Treselection$_{RAT}$ for E-UTRAN is Treselection$_{EUTRA}$, for UTRAN Treselection$_{UTRA}$ for GERAN Treselection$_{GERA}$, for Treselection$_{CDMA\ HRPD}$, and for Treselection$_{CDMA\ 1xRTT}$). |
| Thresh$_{X,HighP}$ | This specifies the Srxlev threshold (in dB) used by the UE when reselecting towards a higher priority RAT/frequency than the current serving frequency. |
| Thresh$_{X,HighQ}$ | This specifies the Squal threshold (in dB) used by the UE when reselecting towards a higher priority RAT/frequency than the current serving frequency. |
| Thresh$_{X,LowP}$ | This specifies the Srxlev threshold (in dB) used by the UE when reselecting towards a lower priority RAT/frequency than the current serving frequency. |
| Thresh$_{X,LowQ}$ | This specifies the Squal threshold (in dB) used by the UE when reselecting towards a lower priority RAT/frequency than the current serving frequency. |
| Thresh$_{Serving,LowP}$ | This specifies the Srxlev threshold (in dB) used by the UE on the serving cell when reselecting towards a lower priority RAT/frequency. |
| Thresh$_{Serving,LowQ}$ | This specifies the Squal threshold (in dB) used by the UE on the serving cell when reselecting towards a lower priority RAT/frequency. |
| S$_{IntraSearchP}$ | This specifies the Srxlev threshold (in dB) for intra-frequency measurements. |
| S$_{IntraSearchQ}$ | This specifies the Squal threshold (in dB) for intra-frequency measurements. |
| S$_{nonIntraSearchp}$ | This specifies the Srxlev threshold (in dB) for E-UTRAN inter-frequency and inter-RAT measurements. |
| S$_{nonIntraSearchQ}$ | This specifies the Squal threshold (in dB) for E-UTRAN inter-frequency and inter-RAT measurements. |

A mobility sates of a user equipment is described.

Besides a normal-mobility state, a high-mobility and a medium-mobility state are applicable if the parameters ($T_{CRmax}$, $N_{CR\_H}$, $N_{CR\_M}$ and $T_{CRmaxHyst}$) are sent in the system information broadcast of the serving cell. The medium-mobility state is detected if the criteria for the medium-mobility state "the number of cell reselections during time period $T_{CRmax}$ exceeds $N_{CR\_M}$ and not exceeds $N_{CR\_H}$" is satisfied. The high-mobility state is detected if the criteria for high-mobility state "the number of cell reselections during time period $T_{CRmax}$ exceeds $N_{CR\_H}$" is satisfied. The UE shall not count consecutive reselections between same two cells into mobility state detection criteria if same cell is reselected just after one other reselection.

If, the criteria for the high-mobility state is detected, the UE shall enter the high-mobility state. Else, if the criteria for the medium-mobility state is detected, the UE shall enter the medium-mobility state. Else, if the criteria for either the medium- or the high-mobility state is not detected during time period $T_{CRmaxHyst}$, the UE shall enter Normal-mobility state.

If the UE is in the high- or the medium-mobility state, the UE shall apply speed dependent scaling rules. If neither the medium- nor the high-mobility state is detected, no scaling is applied. If the high-mobility state is detected, the sf-High of "Speed dependent ScalingFactor for $Q_{hyst}$" is added to $Q_{hyst}$ if sent on the system information. For E-UTRAN cells, the sf-High of "Speed dependent ScalingFactor for Treselection$_{EUTRA}$" is multiplied by Treselection$_{EUTRA}$ if sent on the system information. If the medium-mobility state is detected, the sf-Medium of "Speed dependent ScalingFactor for $Q_{hyst}$ for medium mobility state" is added to $Q_{hyst}$ if sent on the system information. For E-UTRAN cells, the sf-Medium of "Speed dependent ScalingFactor for Treselection$_{EUTRA}$" is multiplied Treselection$_{EUTRA}$ if sent on the system information.

Table 2 shows speed dependent reselection parameters described above. The mobility sate of the UE may be estimated based on the speed dependant reselection parameters, and the speed dependent scaling rules may be applied based on the mobility state of the UE.

TABLE 2

| Parameter | Description |
| --- | --- |
| $T_{CRmax}$ | This specifies the duration for evaluating allowed amount of cell reselection(s). |
| $N_{CR\_M}$ | This specifies the maximum number of cell reselections to enter Medium-mobility state. |
| $N_{CR\_H}$ | This specifies the maximum number of cell reselections to enter High-mobility state. |
| $T_{CRmaxHyst}$ | This specifies the additional time period before the UE can enter Normal-mobility state. |
| Speed dependent ScalingFactor for Qhyst | This specifies scaling factor for Qhyst in sf-High for High-mobility state and sf-Medium for Medium-mobility state. |
| Speed dependent ScalingFactor for $Treselection_{EUTRA}$ | This specifies scaling factor for $Treselection_{EUTRA}$ in sf-High for High-mobility state and sf-Medium for Medium-mobility state. |

A multimedia broadcast/multicast service (MBMS) service can be provided by using a single frequency network (SFN) through a frequency layer shared with a non-MBMS service. A UE which intends to receive the MBMS service can acquire information of the MBMS service provided on a current carrier frequency by using control information which is broadcast at a frequency on which the MBMS service is provided. In addition, according to a situation, the UE may also desire to receive an MBMS service provided on another carrier frequency other than the current carrier frequency.

If the UE has knowledge on which frequency an MBMS service of interest is provided, it is allowed to consider that frequency to be the highest priority during the MBMS session. For instance, if carrier 1 on frequency 1 does not provide the MBMS service of interest, but if carrier 2 on frequency 2 provides the MBMS service of interest, the UE camping on a cell of frequency 1 can make the frequency 2 as the highest reselection priority. As a result, it is likely that if the UE is interested to receive the MBMS service of interest, the UE reselects a cell on frequency 2.

Namely, if the UE is interested to receive the MBMS service of interest, the UE can reselect a cell on different frequency, not due to a UE mobility, but due to a user's interest in MBMS services. Thus, even if UE does not move, the UE can perform cell reselection and then increase the number of reselections to estimate UE's mobility state. Such reselection based on user's interest can cause UE to wrongly determine UE's mobility state.

Figure 6:
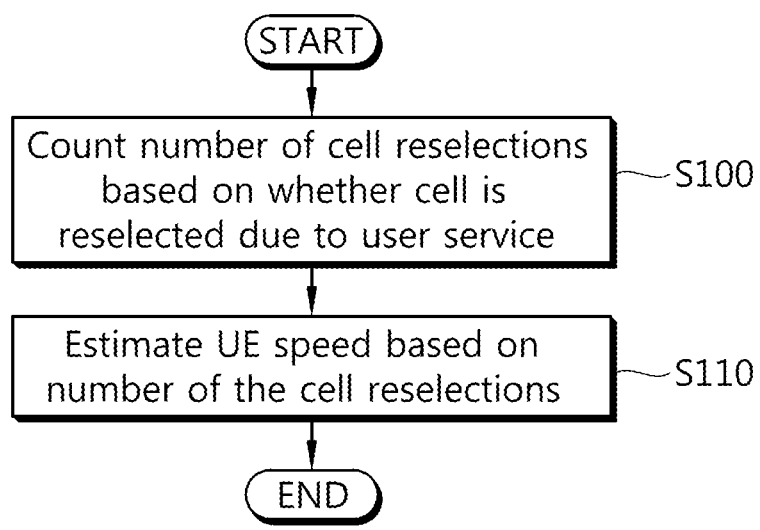
FIG. 6 shows an example of a method for estimating a speed of a user equipment according to an embodiment of the present invention.

FIG. 6 shows an example of a method for estimating a speed of a user equipment according to an embodiment of the present invention.

A UE may identify a cell to reselect a cell and to camp on the reselected cell. Or, the UE may be in RRC_IDLE. At step S100, the UE counts the number of cell reselections based on whether a cell is reselected due to a user service or not. That is, a cell, which provides a specific user service, is reselected due to interest in the user service of the UE, this cell reselection is excluded for counting the number of cell reselection. On the other hand, a cell is reselected not due to interest in the user service of the UE, this cell reselection is counted for the number of cell reselection. The user service may be an MBMS service. The number of cell reselections may be counted for a time period.

At step S110, the UE estimates a speed of the UE based on the number of the cell reselections. That is, the UE may determine a mobility state of the UE based on the estimated speed of the UE. Further, the UE may determine a value of a parameter used for cell reselection by using the estimated speed of the UE. Further, the UE may determine a cell quality by using the estimated speed of the UE. Further, the UE may determine a cell reselection timer by using the estimated speed of the UE. The UE may receive information about the number of cell reselections for the speed of the UE and the time period, via system information broadcast by a cell.

According to an embodiment of the present invention, the mobility state of the UE may be determined as follows. Besides a normal-mobility state, a high-mobility and a medium-mobility state are applicable if the parameters ($T_{CRmax}$, $N_{CR\_H}$, $N_{CR\_M}$ and $T_{CRmaxHyst}$) are sent in the system information broadcast of the serving cell. The medium-mobility state is detected if the criteria for the medium-mobility state "the number of cell reselections during time period $T_{CRmax}$ exceeds $N_{CR\_M}$ and not exceeds $N_{CR\_H}$" is satisfied. The high-mobility state is detected if the criteria for high-mobility state "the number of cell reselections during time period $T_{CRmax}$ exceeds $N_{CR\_H}$" is satisfied.

If the UE is interested to receive a service on a frequency, the UE sets the frequency as the highest reselection priority. Then, if the UE reselects a cell on the frequency providing the service because of the highest reselection priority setting, the UE shall not count this cell reselection for state detection. Namely, if the UE reselects a cell on the frequency providing the service because of the highest reselection priority setting, the UE shall not increase the number of cell reselections by 1. The service may be an MBMS service.

Otherwise, whenever the UE reselects a cell, the UE counts the cell reselection for state detection. Namely, whenever the UE reselects a cell, the UE shall increase the number of cell reselections by 1.

The UE shall not count consecutive reselections between same two cells into mobility state detection criteria if same cell is reselected just after one other reselection.

If, the criteria for the high-mobility state is detected, the UE shall enter the high-mobility state. Else, if the criteria for the medium-mobility state is detected, the UE shall enter the medium-mobility state. Else, if the criteria for either the medium- or the high-mobility state is not detected during time period $T_{CRmaxHyst}$, the UE shall enter Normal-mobility state. If the UE is in the high- or the medium-mobility state, the UE shall apply speed dependent scaling rules as described above.

Figure 7:
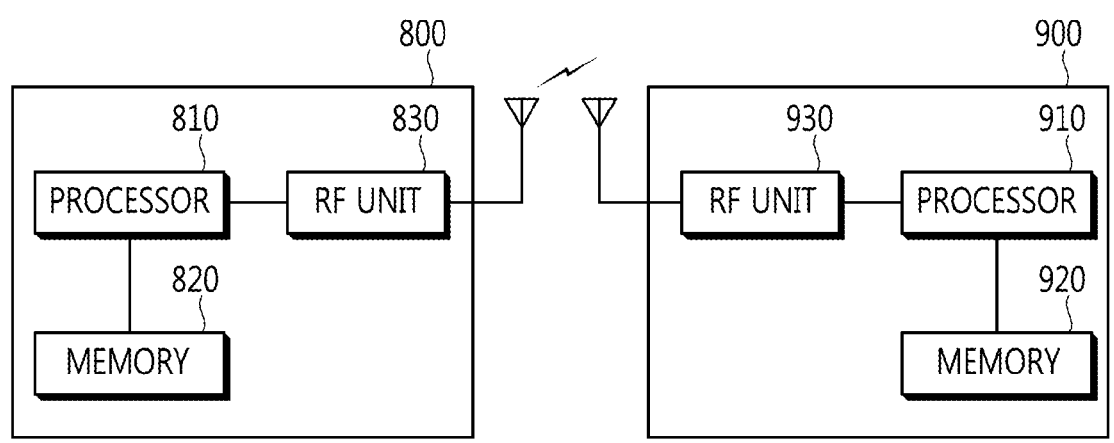
FIG. 7 is a block diagram showing wireless communication system to implement an embodiment of the present invention.

FIG. 7 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for estimating, by a user equipment (UE), UE speed in a wireless communication system, the method comprising:
    counting, by the UE, a number of cell reselections based on whether a cell is reselected due to a user service or not;
    receiving, by the UE, information about the number of cell reselections and a specific time period via system information from a cell; and
    estimating, by the UE, the speed of the UE based on the number of the cell reselections.

2. The method of claim 1, wherein if the cell is reselected due to the user service, the cell is not counted for the number of cell reselections.

3. The method of claim 1, wherein if the cell is reselected due to reasons other than the user service, the cell is counted for the number of cell reselections.

4. The method of claim 1, wherein the number of cell reselections is counted for a specific time period.

5. The method of claim 1, wherein the user service is a multimedia broadcast/multicast service (MBMS) service.

6. The method of claim 1, further comprising determining a value of a parameter used for cell reselection using the estimated speed of the UE.

7. The method of claim 1, further comprising determining a cell quality using the estimated speed of the UE.

8. The method of claim 1, further comprising determining a cell reselection timer using the estimated speed of the UE.

9. The method of claim 1, wherein the UE is in a radio resource control (RRC) idle state.

10. A user equipment (UE) in a wireless communication system, the UE comprising:
    a radio frequency (RF) unit for transmitting or receiving a radio signal; and
    a processor coupled to the RF unit, and configured for:
        counting a number of cell reselections based on whether a cell is reselected due to a user service or not;
        receiving information about the number of cell reselections and a specific time period via system information from a cell; and
        estimating a speed of the UE based on the number of the cell reselections.

11. The UE of claim 10, wherein if the cell is reselected due to the user service, the cell is not counted for the number of cell reselections.

12. The UE of claim 10, wherein if the cell is reselected due to reasons other than the user service, the cell is counted for the number of cell reselections.

13. The UE of claim 10, wherein the number of cell reselections is counted for a specific time period.

14. The UE of claim 10, wherein the user service is a multimedia broadcast/multicast service (MBMS) service.

* * * * *